Aug. 26, 1930.  W. E. TAYLOR  1,773,890
CAN BODY MAKER
Filed Aug. 1, 1927   2 Sheets-Sheet 1

INVENTOR
William E. Taylor
BY Munday, Clarke & Carpenter
ATTORNEYS

Aug. 26, 1930.  W. E. TAYLOR  1,773,890
CAN BODY MAKER
Filed Aug. 1, 1927   2 Sheets-Sheet 2
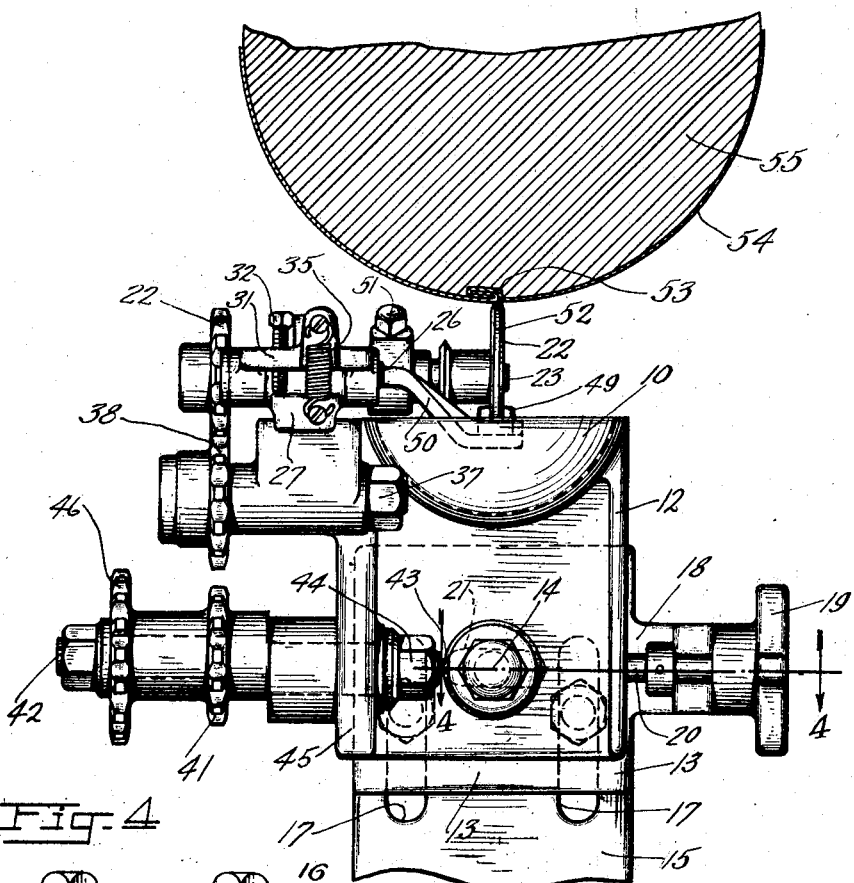
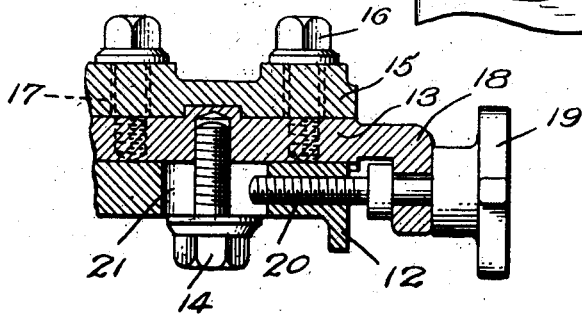
INVENTOR
William E. Taylor
BY
ATTORNEYS Patented Aug. 26, 1930

1,773,890

UNITED STATES PATENT OFFICE

WILLIAM E. TAYLOR, OF EAST ORANGE, NEW JERSEY, ASSIGNOR TO AMERICAN CAN COMPANY, OF NEW YORK, N. Y., A CORPORATION OF NEW JERSEY

CAN-BODY MAKER

Application filed August 1, 1927. Serial No. 209,990.

This invention relates in general to a can body maker, and has more particular reference to a mechanism forming a part of the side seam soldering machine for applying soldering flux to the seamed can bodies.

An important object of the invention is the provision of positively driven fluxing rolls for applying the soldering flux.

Another important object of the invention is the provision of fluxing rolls which are yieldingly movable in a vertical direction to accommodate varying thicknesses of sheet metal stock in the can bodies.

Another important object of the invention is the provision of positively driven fluxing roll mechanism with an adjustment for raising and lowering the mechanism to operate upon can bodies of different diameters.

A further important object of the invention is the provision of a mechanism which is adjustable transversely to the travel of the can bodies to accurately align the fluxing rolls with the side seams.

Another important object of the invention is the provision of fluxing rolls adjustable in their distance from each other to apply a uniform predetermined film of soldering flux to the side seams of the can bodies.

Still another important object of the invention is the provision of adjustable driving means for the fluxing rolls.

Numerous other objects of the invention will be apparent as it is better understood from the following description, which, taken in connection with the accompanying drawings, discloses a preferred embodiment thereof.

In the drawings:

Fig. 3 is an end view of the mechanism, showing a portion of a can body and forming horn in a section; and Fig. 4 is a horizontal sectional view on line 4—4 of Fig. 3.

Figure 1:
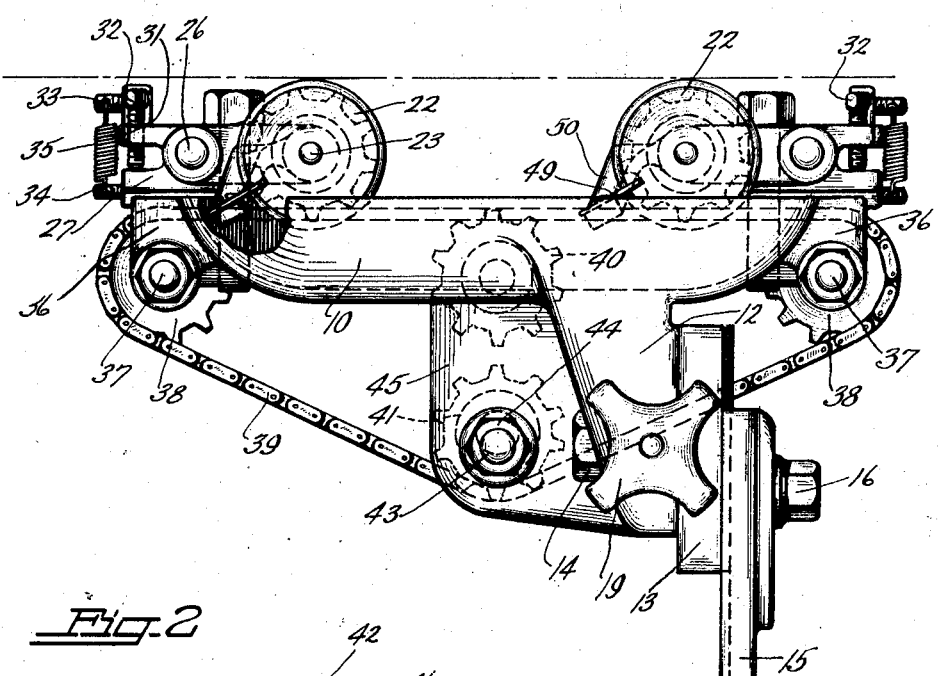
Figure 1 is a side elevation of the flux applying mechanism, partly broken away for clearness.
Figure 2:
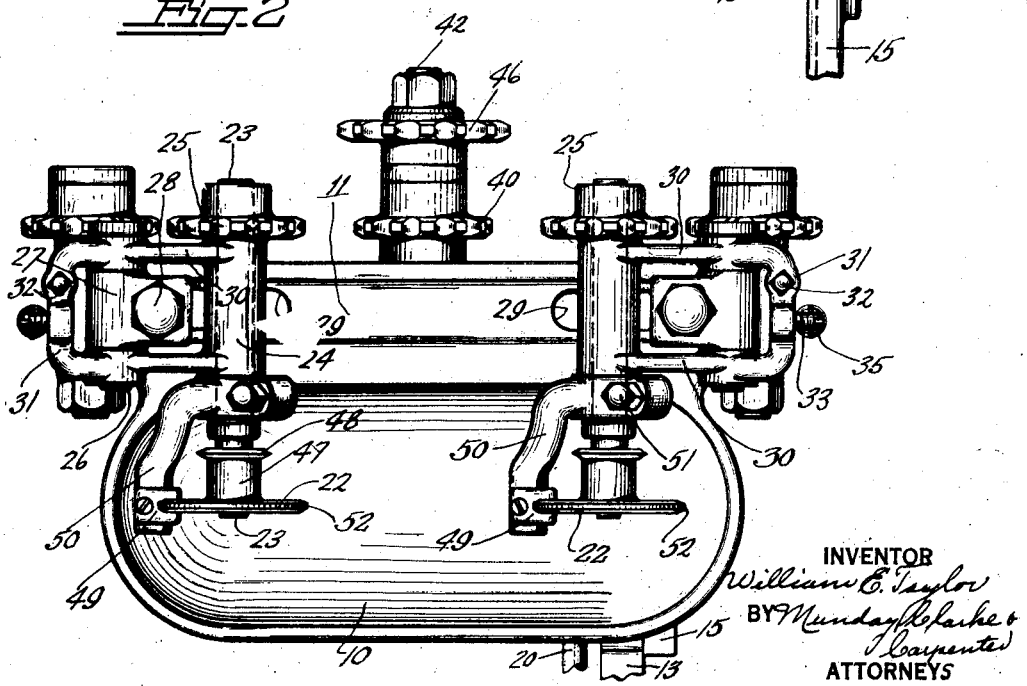
Fig. 2 is a top plan of the mechanism shown in Fig. 1 omitting the driving chain.

In applying the soldering flux for the side seam soldering operation it is necessary not only that the soldering flux rolls engage the seam to be soldered at the proper elevation, and in the proper transverse path, but also that the flux be applied to the seam in a uniform film. The mechanism must, therefore, be capable of complete bodily adjustment and the flux applying rollers must be independently adjustable in order to produce the desired results.

Referring now more particularly to the drawings, a pot 10 for containing liquid soldering flux, preferably oblong and rounded at the ends, is formed at one side with a frame extension 11 and a lower supporting bracket 12. The pot is secured by means of the bracket 12 to a slide part 13 by a fastening bolt 14, and the slide part 13 is vertically adjustable on a fixed support 15 of the machine by means of fastening devices 16 movable in the slots 17 permitting a vertical adjustment of the entire fluxing mechanism.

An extension 18 of the slide part 13 provides a mounting for a star wheel 19 having a shaft 20 adapted to bear against the edge of the supporting bracket 12 for moving the entire flux pot laterally with respect to the slide part 13. To permit this lateral adjustment, the supporting bracket 12 is formed with a slot 21 through which the fastening bolt 14 extends in attaching the bracket 12 to the slide part 13. By slightly loosening the bolt 14 and adjusting the star wheel 19, the outermost periphery of the flux rolls may be accurately aligned with the groove of the side seam without varying the height of the flux pot with respect to the support 15.

The turning of the star wheel moves the slide 13 in the desired direction, horizontally and crosswise of the path of the can seams, on the bracket 13, thereby alining the flux rolls with the line in which side seams of the cans move as they pass over said rolls. This adjustment having been made the bolt 14 is tightened again and said adjustment maintained.

A pair of flux carrying rollers 22 are mounted on rotatable shafts 23 and are adapted to dip below the surface of flux in the pot 10. Each shaft 23 is mounted in a bearing sleeve 24 and carries a driving sprocket 25, the bearing sleeve 24 being mounted on spaced arms 30 to oscillate about a shaft 26 journalled in a bearing member 27 which is disposed between the arms. The bearing member is adjustable at the side of the flux pot 10 by means of a fastening bolt 28 which extends through the bearing member 27 and through a slot 29 of the frame extension 11. The arms 30 are extended and joined on the outer side of the bearing 27 to form a projection 31 which overlies an extension of the bearing 27 so that an adjusting screw bolt 32 inserted through the projection 31 engages the corresponding extension of the bearing 27. Threaded pins 33 and 34 are inserted into the projection 31 and the corresponding portion of the bearing 27 and a coil spring 35 is connected thereto at its ends, thereby tending to draw the projection 31 downwardly and to correspondingly raise the other end of the bearing sleeve 24 which carries the shaft 23 and flux rollers 22. The adjustment of bolt 32, therefore, operates as an accurate means for positioning the flux roller and limiting its upward movement, but permitting a yielding downward movement thereof due to the connection of the spring 35 to accommodate can bodies of variable thickness.

Mounted in a bracket 36 at each end of the extension frame 11 is a shaft 37 which carries a sprocket 38. A sprocket chain 39 runs over the sprockets 38 and under the driving sprockets 25 for the flux rollers 22. This chain 39 also engages a sprocket 40 mounted in line with the sprockets 38 and disposed between the flux wheel sprockets 25. The sprocket chain 39 also passes over an adjustable sprocket 41 mounted on a shaft 42 with an eccentric end 43 and adjustable by means of a nut 44 in an extension plate 45 of the supporting bracket 12. The adjustment of the shaft 42 about its eccentric portion 43 will vary the position of the sprocket 41 to tighten or loosen the sprocket chain 39 in a well-known manner.

Secured to or formed integral with the sprocket 41 is a driving sprocket 46 which extends outwardly beyond the other sprockets and is adapted to be connected by a chain to suitable driving mechanism, which is not shown.

Each of the flux rollers 22 has a hub extension 47 terminating in an angular baffle edge 48 forming a dripping edge for the liquid flux and for preventing the liquid from coming in contact with the shaft 23 and the bearing 24. Each of the flux rollers also rotates in a slotted scraper plate 49 attached to an arm 50 which is adjustably clamped by a fastening screw 51 to the adjacent end of bearing sleeve 24.

The flux rollers 22 have a flat periphery of contact surface 52 to engage a seam 53 of a can body 54 as it moves along a forming mandrel or horn 55 and the width of this flat portion 52 determines the width of the film of soldering flux which is applied to the can seam. The scraper plates 49 prevent the accumulation of any considerable body of flux upon the rollers, and the rollers are spaced apart preferably a distance about equal to the length of the can body applied thereto, so that each of the rollers will contact separately with the can body as it moves along over the flux pot and will apply a continuous coating or film of soldering flux the full length of the can body.

As the width of the film of flux is limited, it is obvious that the flux applying mechanism must be capable of considerable variation and adjustment for accurate engagement of the seam. The flux rollers are adjustable independently of the pot 10 in a vertical direction by means of the adjusting screws 32 and laterally with respect to the seam by adjusting the position of the slide 13 (Fig. 4) as already described. Any material adjustment of the rollers 22 in their distance apart may require a tightening or loosening of the driving chain 39 by means of the eccentrically mounted sprocket 41, and the entire flux applying mechanism may be raised or lowered by means of the slide part 13 and the adjusting nuts 16, or may be adjusted laterally with respect to the slide part 13 independent of the support 15 by loosening the fastening bolt 14 and moving the star wheel 19.

It is thought that this invention and many of its attendant advantages will be understood from the foregoing description, and it will be apparent that many changes may be made in the form, construction and arrangement of the parts without departing from the spirit and scope of the invention or sacrificing all of its material advantages, the form hereinbefore described being merely a preferred embodiment thereof.

I claim:

1. In a flux applying mechanism, a roller and a pivoted sleeve in which it is mounted, a scraper plate for engaging both sides of the roller, an arm to which the scraper plate is attached, and means for adjustably clamping the arm on the sleeve to independently vary the position of the roller axially therein.

2. In a flux applying device, a roller and a shaft on which it is mounted, a sleeve in which the shaft is mounted, and a bearing with which the sleeve is movably connected, the sleeve having an extending projection and a screw adjustable through the projection to engage the said bearing for limiting the movement of the roller in one direction.

3. In a flux applying device, a roller, a sleeve in which it is mounted, a bearing in which the sleeve is oscillated, the sleeve being formed with a projection overlying a portion of the bearing, adjusting means extending through the said projection and engageable with the bearing, and resilient means tending to draw the projection of the sleeve in the direction of the bearing.

4. In a flux applying mechanism, a flux containing receptacle, rollers for dipping into the receptacle to apply the flux, means for driving the rollers, and supporting means including an intermediate slide part for mounting the receptacle for vertical and transverse adjustment.

5. In a flux applying mechanism, the combination, with a flux receptacle having a supporting bracket, of a fixed support with adjustment slots therein, and an intermediate slide part adjustably connected to the fixed support and to the supporting bracket.

6. In a flux applying mechanism, the combination, with a flux receptacle having a supporting bracket, of a fixed support having adjustment slots, and an intermediate slide part connected both to the support and to the bracket, and means for connecting the intermediate part independently to the fixed support and to the supporting bracket for lateral adjustment with one and for vertical adjustment with the other.

7. In a flux applying mechanism, the combination with a receptacle having a supporting bracket, of a fixed support having adjustable slots, an intermediate slide part, means for connecting the slide part to the fixed support for vertical sliding movement, and means for connecting the slide part to the bracket for transverse sliding movement.

8. In a flux applying mechanism, the combination, with a flux receptacle, of means for mounting the receptacle for bodily adjustment in a vertical and transverse direction, a pair of flux applying rollers adapted to dip into the receptacle, and means for adjustably mounting the rollers for vertical movement independent of the other said adjustment.

9. In a flux applying mechanism, the combination with a receptacle, of means for mounting the receptacle for bodily movement in a vertical direction, other means for adjusting the position of the receptacle transversely, flux applying rollers mounted to dip into the receptacle, and means for mounting the rollers for individual transverse movement, said means including a slotted scraper plate for engaging each one of the rollers.

10. In a flux applying mechanism, the combination with a receptacle, of a fixed support therefor, means for mounting the receptacle for independent transverse and vertical movement with respect to the support, flux applying rollers adapted to dip into the receptacle, means for adjustably mounting the rollers for independent vertical movement, and means for independently adjusting the lateral position of each of the rollers.

11. In a flux applying mechanism, the combination, with a receptacle, of rollers adapted to dip into the receptacle, means for adjusting the rollers for independent vertical movement, a driving means for the rollers, said driving means including a driving sprocket for each of the rollers, a plurality of other sprockets mounted in line with but between and beyond the roller driving sprockets, a sprocket chain engaging the roller driving sprockets from the under side and the other said sprockets from the upper side thereof, and an adjustable driving sprocket below which the chain passes comprising a variable eccentric mounting to change the tension of the sprocket chain.

12. In a flux applying device, a roller, a shaft upon which the roller is mounted, a bearing in which the shaft is rotatable, and an extension from the roller in the direction of the bearing having an angular drip surface raised above the extension to prevent flux from the roller from coming in contact with the shaft and the bearing.

13. In a cam bodymaker, the combination, with a forming horn for a seamed can body, of a flux applying mechanism comprising rollers for engaging the can seam, means for adjusting the rollers independently in a vertical and in a transverse direction with respect to a seam, a flux receptacle below the rollers, and means for vertically and transversely adjusting the flux receptacle and the rollers bodily with respect to the forming horn and to a seamed can body carried thereby.

14. In a flux applying mechanism, the combination, with a receptacle having a slotted extension plate, of bearing members adjustable toward and from each other in the plate, a sleeve oscillatable in the bearing, a shaft carried by the sleeve at one side of the bearing, the sleeve having a projection at the other side of the bearing, a flux applying roller mounted on the shaft and adapted to dip into the receptacle, means for varying the height of the roller and limiting its movement in a direction away from the receptacle, said means comprising an adjusting bolt threaded through the said projection and adapted to engage the bearing, and a compression spring extending between the projection and the bearing and tending to draw them together.

15. In a can bodymaker, the combination, with a forming anvil and a seamed can body thereon, of a soldering flux receptacle supported below the anvil, a flux applying roller adapted to dip within the receptacle and to engage the seam of the can body on the anvil, and means for variably mounting the roller for depression within the receptacle but limiting its movement in a direction away from the receptacle.

16. In a can bodymaker, flux applying mechanism comprising a pair of rollers arranged in the same longitudinal plane and adapted to dip in a flux pot and to contact with a can side seam to be soldered, and means for bodily adjusting both of the rollers in a direction toward and from each other.

17. The combination, with a pair of vertically movable flux applying rollers, of means for rotating the rollers including a pair of sprockets, and driving means for the sprockets, comprising a pair of sprockets mounted below and beyond the flux roller driving sprockets, and a driving chain engaging the under side of the roller driving sprockets to permit a vertical movement thereof and engaging the tops of the other sprockets.

18. In a solder flux applying mechanism, a pair of flux applying rollers, sprockets for driving the rollers, a pair of sprockets located below and beyond the roller driving sprockets, an intermediate sprocket below and between the roller driving sprockets, and a sprocket chain engaging all the sprockets and passing below the roller driving sprockets and above all the other said sprockets.

19. In a flux applying mechanism, a pair of flux applying rollers, means for operating the rollers continuously, said means including a sprocket in connection with each roller, a pair of sprockets disposed beyond and below the roller driving sprockets, another sprocket disposed below and between the roller driving sprockets, a sprocket chain for engaging all of the sprockets passing below the roller operating sprockets and above the other said sprockets, and an adjustable sprocket for also engaging the chain below the other sprockets to vary the tension of the chain.

WILLIAM E. TAYLOR.